United States Patent [19]

Grigo et al.

[11] Patent Number: 4,567,226

[45] Date of Patent: Jan. 28, 1986

[54] ELASTOMERIC BLOCK COPOLYAMIDES

[75] Inventors: Ulrich Grigo, New Martinsville, W. Va.; Karl-Heinz Köhler; Rudolf Binsack, both of Krefeld, Fed. Rep. of Germany; Leo Morbitzer, Cologne, Fed. Rep. of Germany; Josef Merten, Korschenbroich, Fed. Rep. of Germany; Ludwig Trabert, Krefeld, Fed. Rep. of Germany; Walter Heitz, Kirchhain, Fed. Rep. of Germany

[73] Assignee: Bayer Aktiengesellschaft, Leverkusen, Fed. Rep. of Germany

[21] Appl. No.: 453,539

[22] Filed: Dec. 27, 1982

[30] Foreign Application Priority Data

Jan. 2, 1982 [DE] Fed. Rep. of Germany ....... 3200020

[51] Int. Cl.$^4$ .................... C08F 8/30; C08L 23/00; C08L 51/00
[52] U.S. Cl. .................... 524/538; 525/184; 525/940
[58] Field of Search ................. 525/184, 940; 524/538

[56] References Cited

U.S. PATENT DOCUMENTS

| | | | |
|---|---|---|---|
| 3,333,024 | 7/1967 | Haefele et al. | 525/134 |
| 3,700,633 | 10/1972 | Wald et al. | 525/134 |

FOREIGN PATENT DOCUMENTS

| | | | |
|---|---|---|---|
| 0058329 | 8/1982 | European Pat. Off. | |
| 2725664 | 12/1977 | Fed. Rep. of Germany . | |
| 2900880 | 7/1980 | Fed. Rep. of Germany . | |
| 2908298 | 9/1980 | Fed. Rep. of Germany . | |
| 1521223 | 4/1968 | France . | |
| 57-47329 | 3/1982 | Japan | 525/184 |
| 57-57720 | 4/1982 | Japan | 525/184 |

*Primary Examiner*—John C. Bleutge
*Assistant Examiner*—A. L. Carrillo
*Attorney, Agent, or Firm*—Connolly and Hutz

[57] ABSTRACT

Block copolyamides consisting of from 1 to 80% by weight of hydrogenated telechelic diene polymers having $M_n$ molecular weight of from 400 to 6000 and from 99 to 20% by weight of polyamides or polyamide-forming components.

13 Claims, No Drawings

ELASTOMERIC BLOCK COPOLYAMIDES

This invention relates to elastomeric block copolyamides of hydrogenated linear poly-1,3-diene blocks and polyamide blocks.

Polyamides are of importance in the production of fibres and mouldings by virtue of their valuable technological properties such as, for example, their stiffness and toughness, their resistance to corrosion caused by stress crazing and their solvent resistance.

However, their elastic properties, measured as reversible elongation and alternating bending strength, are not always sufficient for certain applications, particularly where high dynamic strength is required.

It is known that the elasticity of polyamides is improved by the addition of suitable plasticisers. However, these products have the disadvantage of migration of the plasticiser and relatively poor notched impact strength. The problem of migration of the plasticiser may be avoided by incorporating elastomeric soft segments into polyamides so that block copolyamides having certain elastic properties are formed. Dimeric fatty acid is one example of a suitable elastomeric soft segment. Polyamides containing co-condensed dimeric fatty acid units show improved elastic properties. With high dimeric fatty acid contents, however, the copolyamides become tacky to a certain extent so that mould-release problems can arise. Because of this, the copolyamides in question are used predominately as thermoplastic adhesive (cf. for example DE-OS No. 24 45 167).

Copolyamides containing polyether blocks, optionally in combination with dimeric fatty acid, as soft segments show favourable elastic properties (DE-OS No. 30 06 961). On account of their ether components, however, these products are sensitive to ageing (cf. Ang. Makromol. Chemie 58/59 1977, 299–319).

Although, as described in numerous patents, polyamide moulding compositions having, in some cases, excellent toughness properties can be obtained by admixture with specially modified polymers, such as grafted polyacrylates or grafted polybutadienes or modified polyethylenes, the polyamide moulding compositions obtained in this way show relatively poor elastomeric properties, such as reversible elongation and alternating bending strength.

It is now surprisingly possible, by incorporating substantially saturated, originally polyolefinically unsaturated soft segments, to produce copolyamides which are distinguished by very good elasticity, measured as reversible elongation and alternating bending strength, high notched impact strength and relatively high strength and dimensional stability under heat.

Accordingly, the present invention provides block copolyamides produced from:

I. 1 to 80% by weight, preferably 5 to 65% by weight, of hydrogenated, telechelic diene polymers containing as end groups, carbonate ester groups, —OH groups, —NH$_2$ groups or carboxylic acid ester groups and having a molecular weight $\overline{M}n$ of from about 400 to 6000, preferably from about 500 to 4000, and a degree of hydrogenation, based on the diene content of the poly-1,3-diene, of at least 85 mole percent, preferably at least 95 mole percent, more preferably 98 mole percent and, most preferably, 100 mole percent, and II. 99 to 20% by weight, preferably 95 to 35% by weight, of polyamide or polyamide-forming components.

The hydrogenated polydienes used in accordance with the invention are obtained by the catalytic hydrogenation of preferably linear compounds containing two terminal reactive groups corresponding to the following general formula:

$$R^1—R—(X)_n—R—R^1$$

in which:

X represents

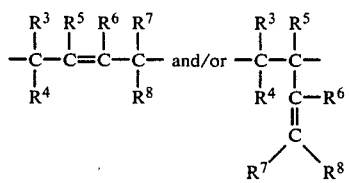

wherein:

$R^3$ to $R^8$ = same or different, $C_1$–$C_4$-alkyl group, H or halogen, n = from about 4 to about 110;

R represents a single bond or a $C_1$–$C_3$ alkylidene group, such as —CH$_2$—,

—CH—,
  |
  CH$_3$

—C(CH$_3$)$_2$— and $R^1$ represents —COOR$^2$, —OH, —CH$_2$NH$_2$ or —O-COOR$^2$ where $R^2$ represents $C_1$–$C_{10}$-alkyl or $C_5$–$C_{10}$-cycloalkyl group or hydrogen (except in the case of —O—CO—OR$^2$).

The polydienes used for the production of the hydrogenated polydienes may be produced, for example, by the processes described in DE-OS No. 29 00 880 and DE-OS No. 29 08 298 from optionally substituted 1,3-dienes, such as for example butadiene, isoprene, dimethyl butadiene and chloroprene, and radical initiators, such as for example dialkyl peroxy dicarbonates or azodicarboxylic acid esters, preferably by block polymerisation. Polydienes containing terminal hydroxy groups may be obtained from the resulting polydienes containing terminal carbonate ester groups by hydrolysis or from polydienes containing terminal carboxylic acid ester groups by reduction of the ester group.

In the poly-1,3-dienes used, the diene units are attached to one another through the 1,2- and/or 1,4-positions. It is preferred to use poly-1,3-dienes in which at least 50 mole percent, preferably 70 mole percent, of the monomer units are attached to one another through 1,4-bonds.

The poly-1,3-dienes used have a molecular weight (number average of the molecular weight determined by vapor pressure osmosis.

$\overline{M}n$ of from about 400 to 6000, preferably from 500 to 4000.

Preferred poly-1,3-dienes consist of units of butadiene, isoprene, dimethyl butadiene, and/or chloroprene an, more preferably, of butadiene and/or isoprene.

Hydrogenation of the poly-1,3-dienes is generally carried out under pressure in the presence of standard hydrogenation catalysts.

Hydrogenation of the poly-1,3-dienes containing terminal carbonate ester groups, OH-groups, carboxylic acid ester or carboxylic acid groups, is carried out, for example, in pure hydrogen on a catalyst of palladium on active carbon, only the poly-1,3-diene chain being hydrogenated.

Hydrogenation of the poly-1,3-dienes containing terminal nitrile groups is carried out, for example, in a mixture of hydrogen and ammonia on a reduced cobalt catalyst. Under these conditions, both the poly-1,3-diene chain and also the terminal nitrile group are hydrogenated, an aminomethylene group being formed from the nitrile group.

The microstructure of the poly-1,3-dienes in regard to the 1,4-/1,2-linkage of the diene units is reproduced in the hydrogenated products in the form of tetramethylene units or ethyl substituted ethylene units.

The degree of hydrogenation, based on the diene content in the poly-1,3-diene, should amount to at least 85 mole percent, preferably to at least 95 mole percent and, more preferably, to 100 mole percent.

The polyamide component may be produced from lactams containing from 4 to 12 carbon atoms in the ring or from corresponding ω-aminocarboxylic acids, such as for example ε-caprolactam, undecane lactam, dodecane lactam, 11-amino-undecanoic acid and 12-amino dodecanoic acid.

The polyamide component may also be a condensation product of an aliphatic, alicyclic or aromatic dicarboxylic acid containing up 2 to 12 carbon atoms, such as for example succinic, adipic, suberic, azelaic, sebacic, di-undecanoic, didodecanoic, terephthalic acid, iso-phthalic acid or cyclohexane dicarboxylic acid, with an aliphatic, alicyclic or aromatic diamine containing from 2 to 12 carbon atoms such as, for example, hexamethylene diamine, n- and/or p-xylylene diamine; 2,2,4-trimethyl hexamethylene diamine, isophorone diamine or bis-(4-amino-cyclohexyl)-methane or -propane.

Of these polyamides, polyamides of adipic acid or azelaic acid and hexamethylene diamine or bis-(4-amino-cyclohexyl)-methane and/or ε-caprolactam and/or lauric lactam are particularly suitable.

The block copolyamides according to the invention may be produced by condensing the polyamide-forming starting compounds in the usual way in the presence of the telechelic polymers.

In this connection, it has proved to be particularly advantageous to use a multistage reaction according to which, in a first stage, a hydrogenated poly-1,3-diene containing terminal ester groups or terminal hydroxyl or amino groups is first reacted under nitrogen with an excess of diamine or dicarboxylic acid at temperatures in the range of from 180° to 250° C. In a further step, the actual polycondensaton reaction is carried out at temperatures in the range of from 220° to 310° C. after the addition of more polyamide-forming monomers. The reaction as a whole should be carried out in such a way that as high a final viscosity as possible is obtained. In order to achieve products having a relatively high molecular weight, it is best to maintain an exact equimolar ratio between the particular terminal groups reacting with one another.

The condensation reaction by which the elastomeric copolymers according to the invention are formed may also be carried out by initially preparing in a preliminary reaction a polyamide block containing terminal carboxyl groups which, in a second stage, is reacted with a hydrogenated polydiene containing either terminal amino groups or terminal OH-groups. Where hydrogenated polydienes of the second type are used, it is best to carry out formation of the block polymer under polyester conditions, i.e. in vacuo and optionally in the presence of a catalyst, such as titanium tetraisopropylate for example. Polyamide blocks containing terminal carboxyl groups are obtained by polycondensation with an excess of dicarboxylic acids. In this case, the length of the macromolecular chain and, hence, the average molecular weight may be additionally varied according to the size of the excess. The block copolyamides derived from ε-caprolactam can be also produced by activated amine polymerization.

The block copolyamides according to the invention should preferably have a relative viscosity of from about 1.6 to 4.5, preferably from 2.0 to 3.5, as measured in m-cresol at 23° C.

The outstanding property of the block copolyamides according to the invention by comparison with analogous copolyamides containing soft segments of polytetrahydrofuran or dimeric fatty acid is the advantageous combination of high elasticity and notched impact strength with high strength and dimensional stability under heat.

Their favourable elasticity is reflected on the one hand in a high reversible elongation and on the other hand in a high alternating bending strength. Reversible elongation is determined in accordance with DIN 53 455 from a correspondingly designed tensile test. In this test, the test specimen is extended by a certain amout under a corresponding load. After the load has been removed, the residual elongation is measured. The difference between elongation under load and after removal of the load represents the reversible elongation. Accordingly, the following equation is used for calculating relative reversible elongation:

$$\text{relative reversible elongation} = \frac{\left(\text{elongation under load} - \text{elongation after load removal}\right)}{\text{elongation under load}} \times 100$$

The higher the reversible elongation, the sooner a deformed test specimen is able to return to its original shape.

Alternating bending strength is determined in accordance with DIN No. 53 359. It is expressed by the number of bends up to failure.

The combination of excellent elasticity and notched impact strength with relatively high strength and stiffness enables the block copolyamides according to the invention to be used in particular for the production of mouldings subjected to impact and deformation, such as for example fenders or damping elements.

In addition, the block copolyamides according to the invention show excellent stability to processing and ageing.

The block copolyamides according to the invention may be modified in the usual way. Accordingly, they may contain, for example, reinforcing materials and fillers, particularly glass fibres, flameproofing agents, stabilisers, nucleating agents, lubricants, mould release agents as well as dyes and pigments.

The reinforcing materials and fillers which are used to increase stiffness and strength are employed in the usual quantities of from 5 to 70 parts by weight, based on 100 parts by weight of additive and the block copolyamide. Suitable reinforcing materials and fillers are, for example, glass fibres, glass beads, kaolin, quartz, mica, wollastonite, talcum, asbestos, titanium dioxide, aluminium oxide, Microvit, chalk or calcined aluminium silicate. Glass fibres are preferred.

In the following examples the parts are parts by weight.

EXAMPLES

(1) Production of the poly-1,3-dienes (a) Poly-1,3-diene dicarboxylic acid dimethyl ester and poly-1,3-diene diisobutyronitrile The poly-1,3-diene dicarboxylic acid dimethyl ester was produced by the processes described in DE-OS No. 29 00 880 and DE-OS No. 31 05 365, an azo-bisisobutyric acid methyl ester being used as initiator for polymerisation of the diene. The poly-1,3-diene isobutyronitrile are similarly produced using azo-bisisobutyronitrile as initiator.

(b) Poly-1,3-dienes containing terminal carbonate ester and OH-groups

The poly-1,3-dienes containing terminal carbonate ester groups are produced as described in I(a) using dialkyl peroxy dicarbonates as initiators. The terminal carbonate groups are converted into hydroxyl groups by alkaline hydrolysis.

(II) Hydrogenation of the poly-1,3-dienes (a) Poly-1,3-dienes containing terminal carboxylic acid methyl ester, carbonate ester and OH-groups ("chain hydrogenation"")

In a steel autoclave, 1 part of poly-1,3-diene, 4 parts of tetrahydrofuran (THF) or cyclohexane and 0.03 part of a 5% palladium on active carbon are thoroughly mixed while stirring and subsequently hydrogenated for 2–3 hours at 50° C. under a hydrogen pressure of 50 bars. The course of the hydrogenation reaction may be followed via the reduction in pressure.

(b) Poly-1,3-dienes containing terminal nitrile groups ("chain and terminal group hydrogenation")

1 part of poly-1,3-diene, 0.2 part of alkali-free reduced cobalt catalyst and 1 part of ammonia and optionally 3 parts of THF or cyclohexane are thoroughly mixed while stirring in a steel autoclave. Hydrogen is then introduced under pressure and the reaction components are hydrogenated for 12 to 18 hours at 125°–150° C. under a total pressure of around 250 bars. The course of the hydrogenation reaction may be followed via the reduction in pressure. Terminal group hydrogenation takes place more quickly than chain hydrogenation.

(III) Working up of the hydrogenated poly-1,3-dienes

The solutions of hydrogenated poly-1,3-dienes in THF or cyclohexane obtained in accordance with II(a) and (b) are filtered off hot from the catalyst. The catalyst residue is washed out thoroughly with hot THF. In the case of strongly coloured solutions, it is advisable to repeat the hot filtration step in the presence of silica gel. The solution obtained is concentrated at 70° C. in a water jet vacuum and then freed from residual solvent over a period of 4–6 hours in an oil pump vacuum ($\leq 3$ mbar). A white, highly viscous to wax-like substance (depending on the degree of hydrogenation) is obtained. The degree of hydrogenation may be determined by NMR-spectroscopy and by determination of the iodine number. Production of the elastomeric block copolyamides.

The reaction components listed in Table 1 are condensed under the conditions specified in a reaction vessel equipped with a metal stirrer and a dephlegmator. A slightly clouded highly viscous melt is generally formed. The melt is cooled, granulated and, in the case of PA-6 copolyamides, extracted with water for 4 hours to remove the unreacted caprolactam.

Standard small test bars, flat bars and tension bars are injection-moulded from the granulate at 260° C. using a standard injection-moulding machine.

The standard small test bars were used for testing notched impact strength (DIN No. 53453) and flexural strength (in accordance with DIN No. 53452), the flat bars for testing alternating bending strength (in accordance with DIN No. 53 359) and the tension bars for testing relative reversible elongation (in accordance with DIN No. 53 455).

The composition and properties of the block copolyamides are shown in Table 2.

TABLE 1

Weighing-in and production conditions for Examples 1 to 14

| Example No. | Soft segment type | terminal groups | g(moles) | Adipic acid A hexamethylene diamine H (moles) | Caprolactam g(moles) | Aminocaproic acid g(moles) | Rest | Production conditions normal pressure/N$_2$ | vacuum |
|---|---|---|---|---|---|---|---|---|---|
| 1* | polytetrahydrofuran | OH | 100(0.1) | 14.6(0.1) A | 364(3.2) | 41.7(0.32) | 250 mg titanium tetraisopropylate | 1 h 270° C., 3 h 270° C. | 2 h 270° C./1 Torr |
| 2* | Empol 1010$^{(R)2}$ | COOH | 100(0.17) | 20.2(0.17) H | 364(3.2) | 41.7(0.32) | — | 1 h 220° C., 6 h 270° C. | — |
| 3* | " | " | 200(0.34) | 40.5(0.34) H | 273(2.4) | 31.3(0.24) | — | 1 h 220° C., 6 h 270° C. | — |
| 5 | hydr. poly-1,3-butadiene | NH$_2$ | 50(0.039) | 5.6(0.039) A | 410(3.6) | 47(0.36) | — | 1 h 220° C., 3 h 270° C. | — |
| 6 | hydr. poly-1,3-butadiene | " | 100(0.077) | 11.2(0.077) A | 364(3.2) | 42(0.32) | — | 1 h 220° C., 3 h 270° C. | — |
| 7 | hydr. poly-1,3-butadiene | " | 200(0.154) | 22.5(0.154) A | 273(2.4) | 31.3(0.24) | — | 1 h 220° C., 3 h 270° C. | — |
| 8 | hydr. poly-1,3-butadiene | " | 250(0.192) | 28.1(0.192) A | 228(2.0) | 26.1(0.2) | — | 1 h 220° C., 3 h 270° C. | — |
| 11 | hydr. poly-1,3- | methyl | 50(0.018) | 2.6(0.018) H | 410(3.6) | 47(0.36) | — | 1 h 220° C., | — |

TABLE 1-continued

Weighing-in and production conditions for Examples 1 to 14

| Example No. | Soft segment type | terminal groups | g(moles) | Adipic acid A hexamethylene diamine H (moles) | Caprolactam g(moles) | Aminocaproic acid g(moles) | Rest | Production conditions normal pressure/N$_2$ | vacuum |
|---|---|---|---|---|---|---|---|---|---|
| 12 | butadiene hydr. poly-1,3-butadiene | ester methyl ester | 150(0.054) | 7.8(0.0) H | 315(2.8) | 37(0.28) | — | 3 h 270° C. 1 h 220° C., 3 h 270° C. | — |
| 13 | hydr. poly-1,2-butadiene | OH | 100(0.030) | 4.3(0.030) A | 364(3.2) | 42(0.32) | — | 1 h 220° C., 3 h 270° C. | 2 h 270° C., 3 Torr |
|  |  |  |  |  | AH-salt[1] | excess of H[3] |  |  |  |
| 4* | Empol 1010(R)[2] | COOH | 100(0.17) | 20.2(0.17) H | 463.6(1.8) | 10.3 g  5% | — | 15 mins 270° C., 3 h 290° C. | — |
| 10 | hydr. poly-1,3-butadiene | NH$_2$ | 100(0.077) | 11.2(0.077) A | 463.6(1.8) | 10.3 g  5% | — | 30 mins 270° C., 2.5 h 290° C. | — |

*Comparison Example
[1] 1:1 salt of adipic acid and hexamethylene diamine
[2] Dimeric fatty acid produced by Unilever
[3] H = hexamethylene diamine

TABLE 2

Composition and properties of the elastomeric block copolyamides

| Example | polyamide type | % by wt. | hydr. poly-1,3-diene terminal group | Mn | % by wt. | other soft segm. type | % by wt. | $\sigma_{bB}$[4] Mpa | $\epsilon_{rev.}$[5] % | $a_k$[6] kJ/m$^2$ 25° C. | Alt. bend. strength n | Vicat B °C. |
|---|---|---|---|---|---|---|---|---|---|---|---|---|
| 1* | PA 6 | 80 | — | 1000 | — | poly-THF[8] | 20 | 60 | 32 | 8 | 72,000 | 124 |
| 2* | PA 6 | 80 | — | 574 | — | Empol ®[2] 1010 | 20 | 68 | 36 | 7 | 40,000 | 128 |
| 3* | PA 6 | 60 | — | 574 | — | Empol ®[2] 1010 | 40 | 34 | 51 | 42 | 57,000 | 37 |
| 4* | PA 66 | 80 | — | 574 | — | Empol ®[2] | 20 | 73 | 26 | 5 | 11,000 | 134 |
| 5 | PA 6 | 90 | NH$_2$ | 1300 | 10 | — | — | 95 | 26 | 16 | 68,000 | 175 |
| 6 | PA 6 | 80 | NH$_2$ | 1300 | 20 | — | — | 70 | 40 | 23 | 100,000 | 150 |
| 7 | PA 6 | 60 | NH$_2$ | 1300 | 40 | — | — | 29 | 55 | ub.[9] | 100,000 | 61 |
| 8 | PA 6 | 50 | NH$_2$ | 1300 | 50 | — | — | 12 | 62 | " | 100,000 | 37 |
| 10 | PA 66 | 80 | NH$_2$ | 1300 | 20 | — | — | 74 | 32 | 11 | 28,000 | 162 |
| 11 | PA 6 | 90 | methylester | 2800 | 10 | — | — | 96 | 25 | 17 | 73,000 | 172 |
| 12 | PA 6 | 70 | " | 2800 | 30 | — | — | 58 | 47 | 51 | 100,000 | 90 |
| 13 | PA 6 | 80 | —OH | 3400 | 20 | — | — | 79. | 24 | 5 | 80,000 | 146 |

[4] = flexural strength (DIN 53 453)
[5] = reversible elongation as measured after 100% elongation
[6] = notched impact strength
[7] n = number of bends to failure
[8] Poly-THF with —NH$_2$ endgroup, Mn ≈ 100 by vapor pressure osmosis;
[2] = a dimeric fatty acid made by Unilever
* = Comparison Examples
[9] = unbroken

We claim:

1. Elastomeric block copolyamides produced from
   I. 1 to 65%, by weight of the elastomeric block copolyamides, of hydrogenated diene polymers containing as end groups carbonate ester, —OH, —NH$_2$, carboxylic acid or carboxylic acid ester groups where said hydrogenated diene polymers have a degree of hydrogenation of at least 95 mole percent and have a molecular weight Mn of from about 400 to 6000 and
   II. 99 to 35%, by weight of the elastomeric block copolyamides, of polyamides or polyamide-forming components.

2. Block copolymers as claimed in claim 1 being produced from 5 to 65% by weight of the component I and from 95 to 35% by weight of component II.

3. Block copolymers as claimed in claim 1, wherein the component I has a molecular weight Mn of from 500 to 4000.

4. Block copolymers as claimed in claim 1, wherein the degree of hydrogenation is 100 mol-%.

5. Block copolymers as claimed in claim 1, wherein the component I is derived from poly-butadiene, isoprene, dimethyl butadiene and/or chloroprene.

6. Block copolymers as claimed in claim 1, wherein the component II is derived from a lactam having at least five ring members or a corresponding ω-aminocarboxylic acid or of an aliphatic, aromatic or alicyclic dicarboxylic acid having up to 12 C-atoms and an aliphatic, aromatic or alicyclic diamine having from 4 to 12 C-atoms.

7. Block copolymers as claimed in claim 6, wherein the lactam is ε-caprolactam.

8. Block copolymers as claimed in claim 1 further comprising standard additives.

9. Block copolymers as claimed in claim 8, wherein the standard additives comprise 5 to 70 parts, by weight, based on 100 parts by weight of the additive and the block copolyamide, of fillers, reinforcing agents or mixtures thereof.

10. A process for the production of elastomeric block copolyamides comprising:
   I. 1 to 65% by weight of the elastomeric block copolyamides, of hydrogenated diene polymers containing as end groups carbonate ester, —OH, —NH$_2$, carboxylic acid or carboxylic ester groups and having a molecular weight $\overline{Mn}$ of from about 400 to 6000 and II. 99 to 35% by weight of the elastomeric block copolyamides, of polyamide-forming components, wherein II is polycondensed in the presence of I.

11. A process as claimed in claim 10, wherein the polyamide forming monomers are reacted in the presence of component I under nitrogen at temperatures of from 180° to 250° C. and after the addition of further polyamide forming monomers at temperatures of from 220° to 310° C.

12. Block copolymers as claimed in claim 10 further comprising standard additives.

13. Block copolymers as claimed in claim 12, wherein the standard additives comprise 5 to 70 parts by weight, based on 100 parts by weight of the additive and the block copolyamide, of fillers, reinforcing agents or mixtures thereof.

* * * * *

Notice of Adverse Decision in Interference

In Interference No. 101,978, involving Patent No. 4,567,226, U. Grigo, K-H. Kohler, R. Binsack, L. Morbitzer, J. Merten, L. Trabert, W. Heitz, ELASTOMERIC BLOCK COPOLYAMIDES, final judgment adverse to the patentees was rendered Mar. 1, 1990, as to claims 1-13.
*( Offical Gazette May 8, 1990 )*